Sept. 30, 1941.　　　U. WOLFROM　　　2,257,213
CLOSURE FOR HIGH PRESSURE VESSELS
Filed Aug. 3, 1937

Ulrich Wolfrom Inventor
By P. L. Young Attorney

UNITED STATES PATENT OFFICE 2,257,213

CLOSURE FOR HIGH PRESSURE VESSELS

Ulrich Wolfrom, Leuna, Germany, assignor to Standard Catalytic Company, a corporation of Delaware Application August 3, 1937, Serial No. 157,099
In Germany August 5, 1936

2 Claims. (Cl. 220—46)

For the tight sealing of a cover on to a high pressure vessel advantageously self-tightening elastic sealing rings are employed. The pressure on the sealing surfaces proper is increased with such sealing rings with increase of pressure inside the high pressure vessel. Therefore a moderate initial pressure on the sealing surfaces is sufficient when closing the high pressure vessel.

In the application of a self-tightening, hard elastic sealing ring, which fits with its lower conical or conical-like sealing surfaces against conical or conical-like surfaces of the opening of a high pressure vessel and to a cover pressed from the outside against the opening of said vessel, the possibility of damaging the ring by too great tangential stresses therein caused by drawing on the cover too strongly can be avoided if at the inside of the sealing ring a buffer body is provided against which the sealing ring is buffered when it has been radially deformed.

I have now found that in the latter construction the elastic properties of the sealing ring may be fully utilized, and the danger of the sealing ring being deformed and damaged is avoided by providing a ring which, before use, has an inner diameter which is greater than the outer diameter of the buffer body employed therewith, by about one thousandth part of the diameter of the buffer body employed.

Preferably the construction is so dimensioned that the sealing ring is buffered already when it is radially deformed to such a degree as is admissible in view of its resistance.

Figure 2:
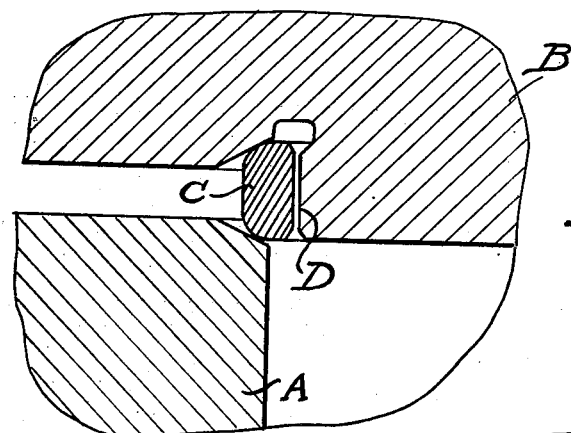
Figure 3:
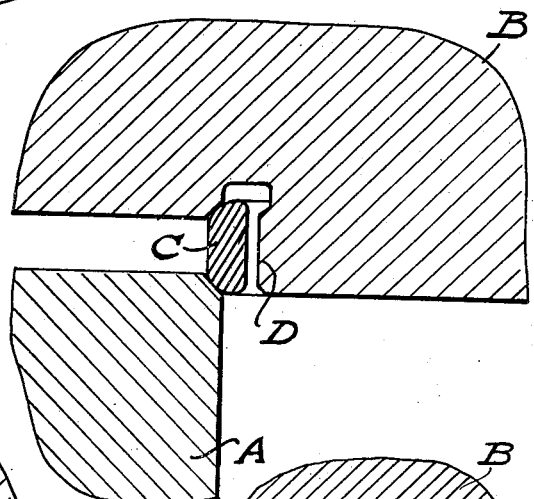
Figures 1, 4:
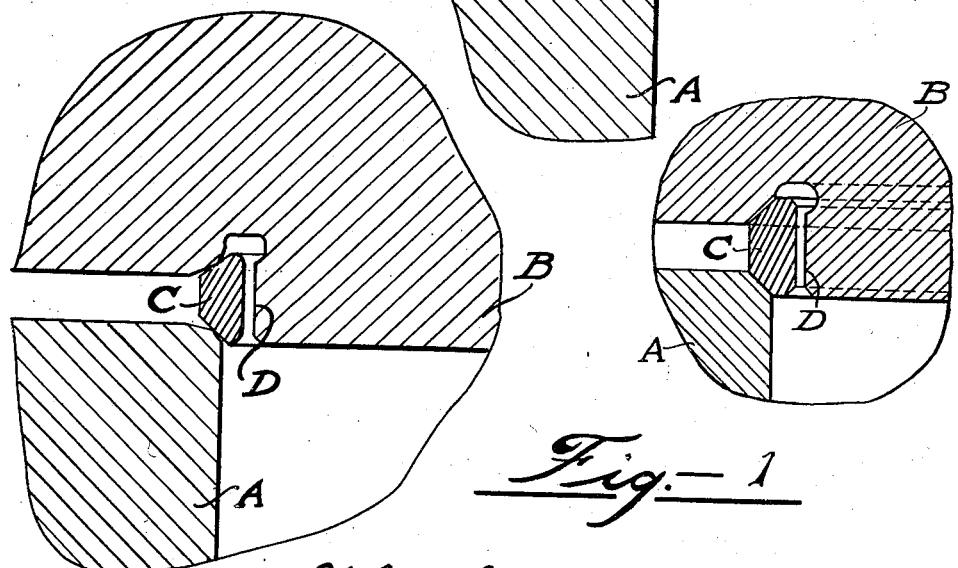

The drawings are diagrammatic sectional elevations which illustrate preferred features of the invention. Figure 1 represents a preferred structure, while Figures 2, 3 and 4 indicate alternative structures for the sealing elements.

One modification of a closure for high pressure vessels according to the invention is shown in Figure 1, but the invention is not limited to the closure illustrated. Between the wall of the container A and the cover B the sealing ring C is present which fits with its lower conical surfaces against container and cover. Inside the sealing ring the buffer body D is present with small clearance. Said buffer body is formed in the construction here illustrated by a cylindrical annex to the cover. Before initial compression of the sealing ring, by application of the cover, it should have an inner diameter which is larger than the outer diameter of the buffer body by about one thousandth part thereof. For example, if the outer diameter of the buffer body were 500 millimetres, the inner diameter of the sealing ring would be 500.5 millimetres.

If the cover B is drawn against the container A, then the ring is pressed together, due to the wedge action of the conical surfaces, whereby its diameter is diminished and thereby a compressive stress is set up in tangential direction in its cross section. If this compressive stress has attained a value of about 2000 kilograms per square centimetre, then the ring comes with its cylindrical inner surface into contact with the buffer body. A further drawing of the cover against the container can therefore not cause a further increase of the compressive stress in the cross section of the ring in tangential direction but only the pressures on the conical surfaces and on the inner surface of the ring are increased in radial direction. Harmful overstressing of the ring is thereby avoided. The ring is suitably made of a high grade, elastic, hardened constructional material. The angle which the conical surface makes with the horizontal may vary within wide limits. Thus for example angles of 75, 60 or 45° with the horizontal have been found to be very satisfactory.

Instead of completely shaped conical surfaces as shown in Figure 1 the tightening parts may also have conical-like surfaces which are rounded like a ball or one of the conical surfaces may make contact by means of a blunt edge with the other surface. Such forms of construction are shown in the Figures 2, 3 and 4. When working with very high pressures it is however in general advantageous to apply true and fully bearing, conical surfaces.

The sealing of high pressure vessels in accordance with the present invention may be applied with great advantage in apparatus for the treatment with hydrogenating gases of distillable carbonaceous materials such as the destructive hydrogenation of coal, mineral oil and the like.

What I claim is:

1. A closure for a high pressure vessel opening, including a self-tightening seal therefor, comprising a cover for the opening, said cover and the adjacent edge of said opening being provided with opposed, substantially conical, annular seating surfaces, a sealing ring buffer body substantially within the vessel at said opening, spaced radially inwardly of the seating surface thereof, and a hard elastic, sealing ring having a peripheral shape and diameter substantially conforming to that of said seating surfaces, engaging said seating surfaces and located between said buffer body and said seating surfaces and an inner diameter which is greater than the outer diameter of said buffer body by about one thousandth part thereof.

2. A closure for a high pressure vessel opening, including a self-tightening seal therefor, comprising a cover for the opening, said cover and the adjacent edge of said opening being provided with opposed, substantially conical, annular seal seating surfaces, a seal buffer body dependent from said cover substantially within the vessel at said opening, spaced radially inwardly of the seating surface thereof, and a hard, elastic, sealing ring, having a peripheral shape and diameter substantially conforming to that of said seating surfaces, engaging said seating surfaces and located between said buffer body and said seating surfaces and an inner diameter which is greater than the outer diameter of said buffer body by about one thousandth part thereof.

ULRICH WOLFROM.